(12) United States Patent
Robert et al.

(10) Patent No.: US 9,048,902 B2
(45) Date of Patent: Jun. 2, 2015

(54) TRANSMISSION APPARATUS AND METHOD USING PRE-DISTORTION

(75) Inventors: Joerg Robert, Vreden (DE); Nabil Sven Loghin, Stuttgart (DE); Lothar Stadelmeier, Stuttgart (DE); Jan Zoellner, Braunschweig (DE)

(73) Assignee: Sony Corporation, Tokyo (JP)

(*) Notice: Subject to any disclaimer, the term of this patent is extended or adjusted under 35 U.S.C. 154(b) by 8 days.

(21) Appl. No.: 13/992,830

(22) PCT Filed: Nov. 21, 2011

(86) PCT No.: PCT/EP2011/070554
§ 371 (c)(1),
(2), (4) Date: Aug. 15, 2013

(87) PCT Pub. No.: WO2012/076320
PCT Pub. Date: Jun. 14, 2012

(65) Prior Publication Data
US 2013/0315339 A1    Nov. 28, 2013

(30) Foreign Application Priority Data

Dec. 10, 2010  (EP) .................................. 10194605

(51) Int. Cl.
*H04B 7/02* (2006.01)
*H04L 1/02* (2006.01)
*H04B 1/04* (2006.01)
*H04L 25/03* (2006.01)
*H04L 27/26* (2006.01)

(52) U.S. Cl.
CPC ........ *H04B 1/0475* (2013.01); *H04L 25/03343* (2013.01); *H04L 27/2626* (2013.01); *H04L 2025/03414* (2013.01)

(58) Field of Classification Search
USPC .......................................... 375/267, 340, 296
See application file for complete search history.

(56) References Cited

U.S. PATENT DOCUMENTS 8,699,620 B1 * 4/2014 Wu .............................. 375/297
2006/0067422 A1   3/2006 Chung
(Continued)

FOREIGN PATENT DOCUMENTS

EP          2 051 402        4/2009

OTHER PUBLICATIONS

International Search Report Issued Feb. 23, 2012, in PCT/EP11/070554 Filed Nov. 21, 2011.

*Primary Examiner* — Shuwang Liu
*Assistant Examiner* — Nader Bolourchi
(74) *Attorney, Agent, or Firm* — Oblon, McClelland, Maier & Neustadt, L.L.P.

(57) ABSTRACT

A transmission apparatus and method for transmitting data within a multi-carrier transmission system including two or more transmission apparatuses configured to transmit same data. To avoid destructive interferences the transmission apparatus includes a signal input configured to receive multi-carrier signals carrying data to be transmitted, a distortion unit configured to distort the multi-carrier signals by use of a distortion function including a phase parameter for differently modulating phase of the multi-carrier signals, the distortion function being different from distortion functions used by other transmission apparatuses, whose coverage areas overlap with the coverage area of the present transmission apparatus, by using a phase parameter different from the phase parameter used by the other transmission apparatuses, and a transmission unit configured to transmit the distorted multi-carrier signals as a transmission signal.

15 Claims, 6 Drawing Sheets

(56) References Cited

U.S. PATENT DOCUMENTS

| | | |
|---|---|---|
| 2007/0211786 A1 | 9/2007 | Shattil |
| 2007/0248172 A1* | 10/2007 | Mehta et al. .......... 375/260 |
| 2009/0092073 A1 | 4/2009 | Doppler et al. |
| 2009/0313528 A1 | 12/2009 | Chugg et al. |

\* cited by examiner

TRANSMISSION APPARATUS AND METHOD USING PRE-DISTORTION

FIELD OF INVENTION

The present invention relates to a transmission apparatus and a corresponding transmission method for transmitting data within a multi-carrier transmission system comprising two or more transmission apparatuses that are configured to transmit the same data. Further, the present invention relates to a corresponding receiver apparatus and receiving method for receiving data in such a multi-carrier transmission system and to such a multi-carrier transmission system. Finally, the present invention relates to a computer program for implementing said methods and a computer readable non-transitory medium storing such a computer program.

BACKGROUND OF THE INVENTION

Digital terrestrial broadcast systems typically transmit OFDM (Orthogonal Frequency Division Multiplex) signals in a single frequency network (SFN). In certain scenarios, however, signals arriving from several (at least two) transmission apparatuses, interfere destructively and the complete signal is canceled (over almost all subcarriers). This behavior was even measured in different field trials, where there are spots in the landscape, which are permanently in deep fade. When the different transmission apparatuses have slightly different frequencies, then these spots move with time, yielding bad reception conditions in various places.

The application of MIMO (Multiple Input Multiple Output) is also an option for increased payload bit-rates and robustness in the currently developed DVB-NGH (Digital Video Broadcasting—Next Generation Handheld) standard. However, the application of MIMO in a broadcasting environment has certain drawbacks. Firstly, it is commonly known that MIMO does not offer high gain for low signal to noise ratios (SNR) if no feedback from the receiver to the transmitter is available, which is most likely the case for DVB-NGH. Secondly, compared to SISO (Single Input Single Output), or SIMO (Single Input Multiple Output) (i.e. equivalent to the already deployed reception diversity), the application of MIMO requires additional pilots for channel estimation. Especially for larger networks, which typically yield many echoes in the corresponding impulse responses, even SISO transmission requires a high pilot overhead to estimate the highly frequency selective channel. This pilot overhead may consume the complete gain offered by MIMO, if the pilot density has to be doubled. Furthermore, the requirement to estimate additional channels leads to additional noise in the estimated channel coefficients.

For instance, the efficiency of the MISO (Multiple Input Single Output) scheme for DVB-T2 (which also uses MIMO pilots) has shown a significant additional degradation due to the channel estimation, which is able to reach up to 0.5 dB additional degradation compared to the SISO case. Hence, it is highly desirable for a multi-carrier transmission system to obtain the MIMO gain in terms of additional diversity, but without having the drawback of the MIMO channel estimation.

SUMMARY OF INVENTION

It is an object of the present invention to provide a transmission apparatus and a corresponding transmission method that provide increased robustness and avoid signal losses if the same data are transmitted by two or more transmission apparatuses arranged in the same coverage area. It is a further object of the present invention to provide a corresponding receiver apparatus and receiving method as well as a corresponding transmission system. Finally, it is an object to provide a computer program for implementing said methods and a computer readable non-transitory medium.

According to an aspect of the present invention there is provided a transmission apparatus for transmitting data within a multi-carrier transmission system comprising two or more transmission apparatuses that are configured to transmit the same data, comprising a signal input configured to receive multi-carrier signals carrying data to be transmitted, a distortion unit configured to distort said multi-carrier signals by use of a distortion function including a phase parameter for differently modulating the phase of said multi-carrier signals, wherein said distortion function is different from distortion functions used by other transmission apparatuses, whose coverage areas overlap with the coverage area of the present transmission apparatus, by using a phase parameter that is different from the phase parameter used by said other transmission apparatuses, and a transmission unit configured to transmit said distorted multi-carrier signals as transmission signal.

According to a further aspect of the present invention there is provided a receiver apparatus for receiving data within a multi-carrier transmission system comprising two or more transmission apparatuses that are configured to transmit the same data, comprising:

a reception input configured to receive a receive signal, said receive signal substantially corresponding to one or more transmission signals transmitted by transmission apparatuses within the reception area of the receiver apparatus, wherein a transmission signal corresponds to distorted multi-carrier signals, said multi-carrier signals being distorted by use of a distortion function including a phase parameter for differently modulating the phase of said multi-carrier signals, wherein said distortion function by a transmission apparatus is different from distortion functions used by other transmission apparatuses, whose coverage areas overlap with the coverage area of the present transmission apparatus, by using a phase parameter that is different from the phase parameter used by said other transmission apparatuses, wherein the phase parameter is determined by use of a phase function, which is identical for all transmission apparatuses within the reception area of the receiver apparatus, and a transmitter identification sequence, which is unique for each transmission apparatus within the reception area of the receiver apparatus, a signal evaluation unit configured to evaluate said receive signal and retrieve the multi-carrier signals, and an identification unit configured to identify one or more transmission apparatuses, from which the one or more transmission signals included in said receive signal have been transmitted, by identification of said transmitter identification sequence from said different phase distortions of the one or more transmission signals included in said receive signal.

According to a further aspect of the present invention there is provided a multi-carrier transmission system comprising two or more of such transmission systems and at least one receiver apparatus, in particular a receiver apparatus as explained above.

According to still further aspects a computer program comprising program means for causing a computer to carry out the step of distorting of the transmission method and/or the steps of evaluating and identifying of the receiving method according to the present invention, when said computer program is carried out on a computer, as well as a computer readable non-transitory medium having instructions stored thereon which, when carried out on a computer, cause the computer to perform the step of distorting of the transmission method and/or the steps of evaluating and identifying of the receiving method according to the present invention are provided.

Preferred embodiments of the invention are defined in the dependent claims. It shall be understood that the various claimed entities, i.e. apparatuses, methods, transmission system, computer program and computer readable medium, have similar and/or identical preferred embodiments as the claimed transmission apparatus and as defined in the dependent claims.

To circumvent the above described effect of destructive interferences in transmission systems in which several transmission apparatuses transmit the same data, i.e. that signals are received in such a way that they cancel each other out (mostly determined by the phases of the subcarriers), the present invention proposes a pre-distortion of the transmitted signals. The transmission apparatuses, whose coverage areas overlap, i.e. from which a particular receiver apparatus receives signals, pre-distort the signal in a different and, preferably, random or almost random-like way. From the point of view of the transmission apparatuses, this would correspond to a MISO (Multiple Input Single Output) scenario. However, the receiver apparatus treats these superimposed signals as a SISO signal. With these pre-distorted signals, the likelihood of complete signal losses is reduced.

In preferred embodiments special care is taken such that the pre-distortion, which the receiver interprets as being part of the transmit channel, does not introduce a prolonged channel impulse response. Finally, in an embodiment measures are proposed how the proposed method can be used to allow identification of the different transmission apparatuses, which could, for instance, be of importance for field measurements, but also for handover mechanisms in moving handheld receivers or for efficient monitoring of the multiple transmitters.

Hence, according to the present invention a scheme is proposed which is able to obtain the additional diversity gain, but without having the additional pilot overhead. The receiver will interpret the detected signal as if it is transmitted from one transmission apparatus only (SISO or SIMO). Furthermore, the present invention is suitable to mix the transmission of MIMO and SISO signals as will be explained below. This is problematic, as transmission apparatuses can not simply be switched on and off quickly enough if only a single transmission apparatus is required for SISO operation. In contrast, the transmission of identical signals by two or more transmission apparatuses would lead to strong additional frequency selectivity, and as simulations have shown, will drastically reduce the performance of the SISO transmission.

It shall be noted that the present invention relates, for instance, to the field of Digital Video Broadcasting (DVB) utilizing Orthogonal Frequency Division Multiplexing (OFDM). Further, the present invention can generally be applied in other broadcast systems, such as DAB (Digital Audio Broadcasting), DRM (Digital Radio Mondial), Media-Flo, ISDB systems or a future ATSC system, but also in other multi-carrier transmission systems such as communications systems (e.g. an LTE system) in which during handover the base stations (transmitters) handing over an existing communication to a mobile station are simultaneously transmitting the same data for a period of time. It should also be noted that the invention is not limited to the use of OFDM, but can generally be applied in all multi-carrier transmission systems and their components for the transmission of multi-carrier signals.

It shall further be noted that the transmission of the "same data" shall be understood as meaning that the same content data is transmitted, which content data have been encoded and/or modulated in the same way and shall be transmitted generally by use of the same transmission parameters, e.g. the same bandwidth, except for the herein proposed distortions avoiding the above described problems.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
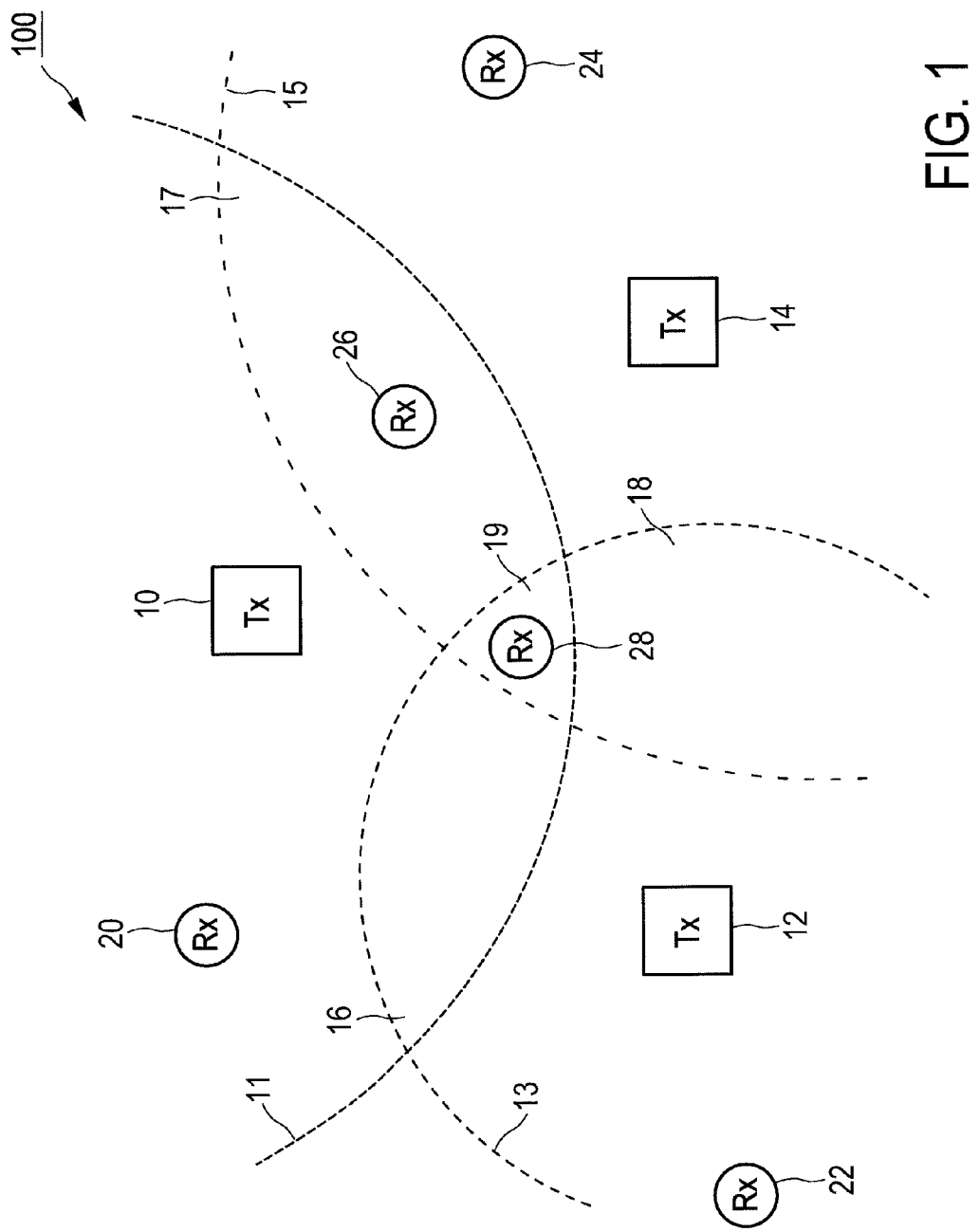
FIG. 1 shows a schematic layout of a transmission system according to the present invention.

FIG. 1 schematically illustrates an embodiment of a multi-carrier transmission system 100 according to the present invention. The transmission system 100 comprises three transmission apparatuses (Tx) 10, 12, 14 and several receiving apparatuses (Rx) 20, 22, 24, 26, 28. Each transmission apparatus 10, 12, 14 has a certain coverage area 11, 13, 15 (indicated by dotted or dashed lines) in which a receiver apparatus can receive signals from the respective transmission apparatus. For instance, the receiving apparatus 22 present in the coverage area 13 can receive signals only from the transmission apparatus 12. The coverage areas 11, 13, 15 of the various transmission apparatuses 10, 12, 14 overlap in certain overlap areas 16, 17, 18, 19 so that receiver apparatuses 26, 28 present in such an overlap area 17, 19 receive signals from two or more transmission apparatuses 10, 12, 14, e.g. the receiver apparatuses 26 present in the overlap area 17 receives signals from the transmission apparatuses 10 and 14.

This might lead to the above described problems of destructive interferences leading to bad reception quality or even signal losses, particularly if transmission apparatuses whose coverage areas overlap as shown in FIG. 1 transmit the same data (in particular the same content encoded/modulated in the same way and by used of the same transmission parameters), e.g. in a broadcast system or in a communications system during handover. This shall particularly be avoided according to the present invention.

Figure 2:
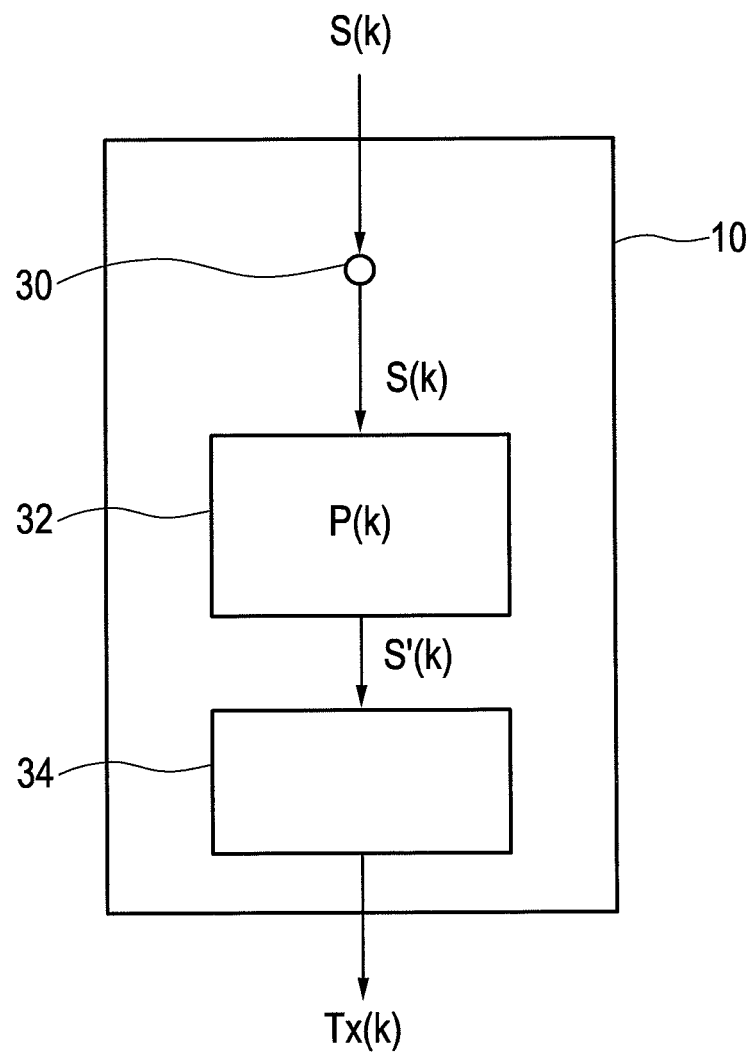
FIG. 2 shows a block diagram of a transmission apparatus according to the present invention.

Accordingly, transmitter apparatuses are proposed according to the present invention as schematically shown in FIG. 2 for use in the transmission system as shown in FIG. 1. Such a transmitter apparatus 10 (the other transmitter apparatuses 12, 14 have a corresponding configuration) comprises a signal input 30 for receiving multi-carrier signals S(k) (e.g. OFDM signals, as will be assumed in the following explanation) carrying data to be transmitted. The received OFDM signals S(k) are provided to a distortion unit 32 for distorting said OFDM signals S(k) by use of a distortion function P(k) including a phase parameter for differently modulating the phase of said OFDM signals S(k). Said distortion function P(k) is different from distortion functions used by other transmission apparatuses 12, 14, whose coverage areas 13, 15 overlap with the coverage area 11 of the present transmission apparatus 10, by using a phase parameter that is different from the phase parameter used by said other transmission apparatuses 12, 14. The distorted OFDM signals S'(k) are provided to a transmission unit 34 (including a transmission antenna) for transmitting said distorted OFDM signals S'(k) as transmission signal Tx(k).

One idea behind the present invention is the avoidance of any regular structure of the resulting fades of two or more transmission apparatuses (also simply called "transmitters" in the following) having overlapping coverage areas as shown in FIG. 1, in particular when using a SISO mode (or in MIMO or MISO mode, where the same problem could appear, but with a smaller negative impact) in which all transmitters send the same signal (comparable to an SFN system). As the signals of both transmitters have to be added in amplitude and phase, the signals may cancel each other in specific parts of the network. Due to high correlation of the signals of the two or more transmitters at a receiver present in an overlap area, the signals may even cancel each other over the complete signal bandwidth. However, the effect that the different transmission paths cancel each other completely can be avoided, if the phases of at least all but one transmitters (e.g. one transmitter in case of two transmitters having overlapping coverage areas) are modified over the subcarriers. Then, the case that all data is lost does not occur.

The present invention in an embodiment introduces a random or random-like structure of the phases between the two or more transmitters. Hence, the two or more transmitters still transmit the same data, but the phases of the data are modified differently, e.g. in a random or random-like way. This does not remove the destructive interference within the network, but it spreads this interference equally over the complete signal bandwidth and the complete reception area. However, a simple random-like structure of the phases between the two or more transmitters is not desired, because it should still be possible using the normal (e.g. SISO) channel estimation. This will be explained in the following.

Let S(k) be an original OFDM signal (generally, a multi-carrier signal) in its frequency domain representation, where k is the OFDM subcarrier index. Now, the original signal S(k) is linearly distorted by means of a distortion function P(k), which finally leads to the transmitted signal Tx(k):

$$Tx(k)=S(k) \cdot P(k,tx). \quad (1)$$

The distortion function P(k, tx) also depends on the OFDM subcarrier k. Furthermore, the signal P(k, tx) shall be different (preferably unique) for each of the two or more transmitters (indicated by index tx; in the following also the notations $P_{tx}(k)$ or simply P(k) are used instead) having overlapping coverage areas within the network to ensure highest decorrelation between them. Additionally, the amplitudes of the distorted OFDM subcarriers shall preferably remain constant, while the phases shall be changed to ensure decorrelation. Hence, the distortion function can be expressed by means of a complex phase rotation, i.e.

$$P(k)=e^{j2\pi\phi(k,tx)} \quad (2),$$

where the phase Φ depends on the OFDM subcarrier k and the transmitter.

Preferably, the application of the linear pre-distortion by the distortion function P(k) shall be as invisible as possible to the receiver apparatus (also simply called "receiver" in the following). Assuming a system with one transmitter, in case of an ideal OFDM system, the linear distortions caused by the channel within the frequency domain can be modeled by means of a complex multiplication of the transmitted signal Tx(k) with the complex channel transfer function H(k) on the corresponding OFDM subcarrier k. This leads to $$R(k)=H(k) \cdot Tx(k)=H(k) \cdot (S(k) \cdot P(k)), \quad (3)$$

where R(k) is the received value of the OFDM subcarrier k. By means of an inverse Fourier transform, equation (3) can be expressed within the time domain as $$r(t)=h(t)*(s(t)*p(t))=[h(t)*p(t)]*s(t)=h_{eq}(t)*s(t). \quad (4)$$

The small letters are the time domain representation of the corresponding frequency domain representation, while * denotes the convolution. As already mentioned, the pre-distortion shall be fully transparent to the receiver. Hence, the receiver sees the equivalent channel impulse response $h_{eq}(t)$ and its frequency domain representation $H_{eq}(k)$, which is the Fourier transform of $h_{eq}(t)$. Within $h_{eq}(t)$, h(t) is the actual impulse response and p(t) is the artificial impulse response caused by the linear pre-distortion. As a longer impulse response $h_{eq}(t)$ requires more pilot signals for the sampling, and thus, the equalization of the channel, the term p(t) should be as short as possible. Consequently, the phase term in equation (2) is preferably chosen such that the width of the Fourier transform of this term remains a narrow as possible, as this is exactly the artificial broadening of the equivalent channel impulse response $h_{eq}(t)$ seen by the receiver. A broad artificial impulse response p(t) requires a higher pilot density for the sampling of the resulting channel transfer function. However, it is preferred to avoid this and to keep this artificial impulse response as narrow as possible.

Equation (2) can also be seen as a frequency modulation of the original OFDM data in the frequency domain. The "spectrum" of this frequency modulated signal is exactly the resulting artificial impulse response p(t) seen by the receiver. A simple solution to this problem, i.e. the problem of avoiding a higher pilot density and having a too broad artificial impulse response, is the application of cyclic delay diversity. The signal of one of the transmitters is delayed. In equations (1) and (2) this leads to $$Tx(k)=S(k) \cdot P(k) \text{ with } P(k)=e^{j2\pi\phi(k)}=e^{-j2\pi\Delta k}, \quad (5)$$

where Δ is the (normalized) delay of the signal. Within the time domain representation, this would lead to $$Tx(t)=s(t)*p(t)=s(t-\Delta) \quad (6)$$

for the signal of the first transmitter. The signal of the second transmitter (in case there are only two transmitter having overlapping coverage area) is not modified. This solution works for the co-located transmission, in which transmitters (more precisely, the transmission antennas) are located very closely to each other, of the SISO signal from the two MIMO antennas. Furthermore, the resulting length of the artificial impulse response is just the delay Δ. However, there could still exist some regions in the network which may suffer from fades over the complete bandwidth. This is especially the case for Single Frequency Networks (SFN). A delay of one transmitter only moves the positions of the fades within the network area, but it does not completely avoid it.

Therefore, equations (1) and (2) can also be used with a different modulation of the phase. Although equation (5) is a modulation, which results in a finite length of artificial impulse response, and most other solutions will lead to an infinite length of the resulting impulse response, a finite length is achievable, if slight variations of the amplitude P(k) are accepted. For this purpose, different approaches may be used as will be explained in the following by use of different examples.

In order to limit the broadening of the impulse response, multiple Raised Cosine Functions (also called cos-roll-off function) are used in an embodiment to generate the distortion function (also called pre-coding signal) P(k). Such a cos-roll-off function still has an infinite broadening of the impulse response, but the slopes fall quite steeply if the roll-off-factor is chosen quite high. Therefore, this filter practically leads to a finite length of the artificial impulse response p(t), which is the inverse Fourier transform of the frequency domain representation of the filter, i.e.

$$W_{RC}(k) = \begin{cases} 1 & \text{if} \quad |k| \leq \frac{1-\alpha}{2T} \\ \cos^2\left(\frac{\pi T}{2\alpha}\left(|k| - \frac{1-a}{2T}\right)\right) & \text{if} \quad \frac{1-\alpha}{2T} < |k| \leq \frac{1-\alpha}{2T}, \\ 0 & \text{else} \end{cases} \quad (7)$$

where $W_{RC}(k)$ is also generally called a window function herein, T is a (designable) time constant and α a design constant (the so-called roll-off factor) in the range from 0 to 1. If α=1 is selected the slopes of the time domain signal fall off most steeply (among this set of functions), while for α=0 the slopes fall off least steeply. However, the window function $W_{RC}(k)$ is an ideal rectangular filter for α=0, but for α=1 there are slopes (in frequency domain) of $W_{RC}(k)$, which will affect the edges of the multi-carrier signal. In practice, α is preferably selected in the middle range between 0 and 1.

The sum of multiple correctly aligned cos-roll-off functions in the frequency domain then gives the flat spectrum. However, in principle each cos-roll-off function can be modulated separately, while the maximum broadening of the impulse response is given by the time domain description of the cos-roll-off function. Hence, the distortion function P(k) can be described in the frequency domain as $$P(k) = \sum_{l=1}^{L-1} \left[ e^{j2\pi\Psi(l)} \cdot W_{RC}\left(k - 1 \cdot \frac{N}{L}\right) \right], \quad (8)$$

where $W_{RC}(k)$ is the frequency domain description of the cos-roll-off function, N is the total number of OFDM subcarriers (with index k) and L the number of cos-roll-off functions (generally, the number of window functions), into which the spectrum is divided (the index is given by l). Furthermore, the phase term Ψ(l) (also called phase parameter) is constant for each of the roll-off function, but may vary between the different roll-off-functions (indicated by Ψ(l) in equation (8), where this phase is constant for all subcarriers k in the windowing range of $W_{RC}(k-l^*N/L)$). However, multi-carrier systems like OFDM systems normally do not utilize the maximum number of available carriers N, but they leave some carriers at the edges of the spectrum unmodulated in order to avoid disturbance to neighboring channels. Consequently, the signal is preferably divided into L segments, but only L−1 segments are used.

The actual length of the artificial impulse response only depends on the term $W_{RC}(k)$, which is caused by the linearity of the sums in equation (8). As the phase term of each sum is constant, and the delay term (l*N/L) does not cause any change to the absolute value of the impulse response, the maximum length of the artificial impulse response (i.e. the sum) cannot be longer than the maximum length of each summand.

In an example related to the DVB-T2 8K OFDM mode the variables N and L are set to N=8192 and L=16. Furthermore, the timing constant T can be set such that the different cos-roll-off functions are well aligned and add to 1, i.e.

$$T = L/N = 16/8192. \quad (9)$$

Figure 3:
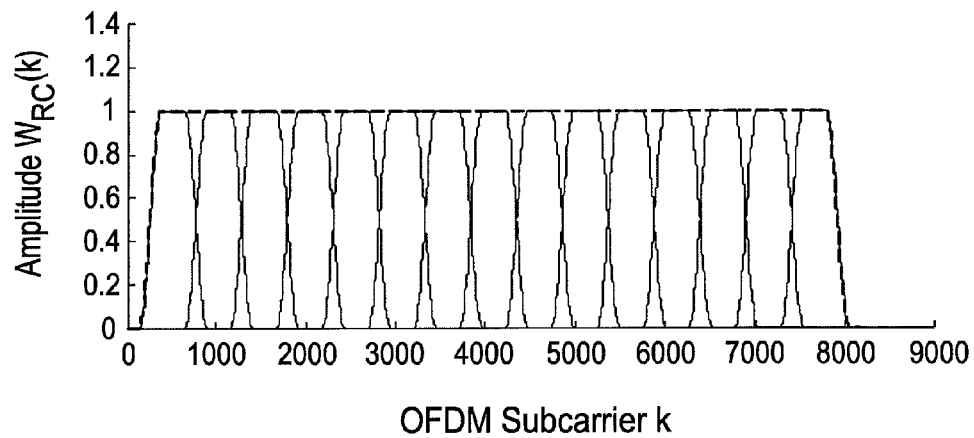
FIG. 3 shows an example of 15 cos-roll-off functions for use in the distortion function.

The factor α can be chosen freely, depending on the maximum allowed length of the resulting artificial impulse response. FIG. 3 shows the 15 resulting cos-roll-off functions and their sum, which is equal to 1 within the range of the actually modulated OFDM subcarriers.

Figure 4:
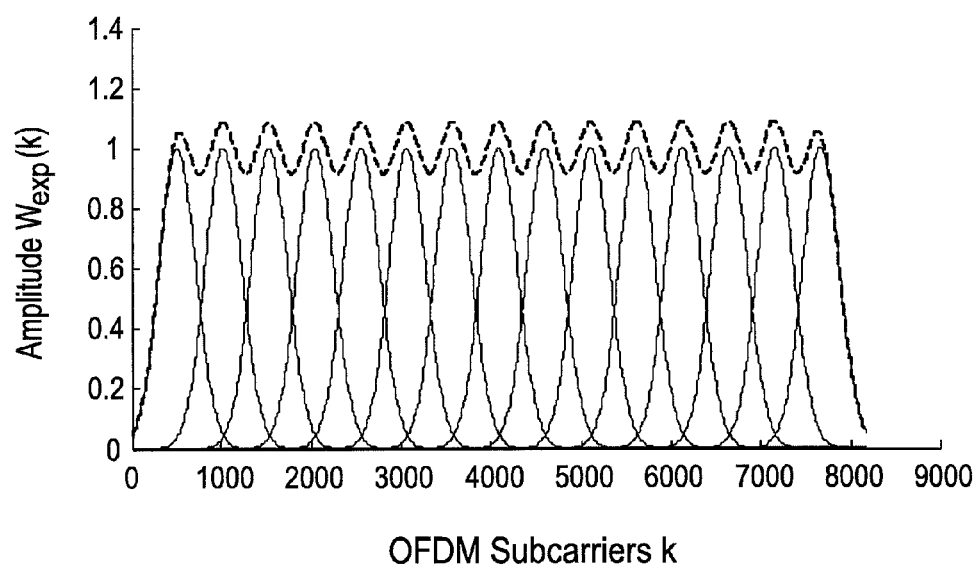
FIG. 4 shows an example of 15 exponential functions for use in the distortion function.

Another example for a window function to obtain the desired characteristics is the exponential function. It can replace the term $W_{RC}$ in equation (8) by $$W_{exp}(k) = e^{-\pi(kT)^2} \quad (10)$$

where the time constant T is similar to equation (9). FIG. 4 depicts the results.

In principle, each function that is well localized in time and frequency (i.e. a function with a compromise of having a short impulse response and a steep slope in frequency domain) can be used as window function W in the definition of the distortion function P $$P(k) = \sum_{l=1}^{L-1} \left[ e^{j2\pi\Psi(l)} \cdot W\left(k - l\frac{N}{L}\right) \right], \quad (11)$$

Further examples are the well-known Hamming window, Hann window, or a sinc²-function etc. In other embodiments, a spectrum of a Nyquist impulse is used as said window function, preferably a spectrum of such a Nyquist impulse whose time domain representation drops as fast as possible to zero.

Hence, in a preferred embodiment the distortion unit 32 uses a distortion function P(k) comprising a sum of two or more window functions W, in particular identical window functions, each window function covering a set of a plurality of subcarriers in the frequency domain. Said sets are overlapping or adjacent to each other, in particular such that the sum of all window functions is substantially constant over the complete bandwidth covered by the subcarriers in the frequency domain. Each window function W of said sum is multiplied with a phase function $e^{j2\pi\Psi(l)}$ including said phase parameter Ψ(l), wherein said phase parameter is preferably constant within a phase function (in general, the phase parameter is linear increasing or decreasing over the frequency). Said phase parameter Ψ(l) is preferably different within the different phase functions.

For ensuring decorrelation between different transmitters, the phase parameter Ψ(l) of each summand in equation (8) is preferably modulated uniquely for each transmitter within a network. This ensures uncorrelated fading, and additionally can be used to identify each transmitter within the network.

Therefore, the phase is modulated in an embodiment by the transmitter identification sequence c as follows:

$$\Psi(0)=c(l)$$

$$\Psi(l)=\Psi(l-1)+c(l)/8 \text{ with } c\in\{-1,0,1\}. \quad (12)$$

Figure 5:
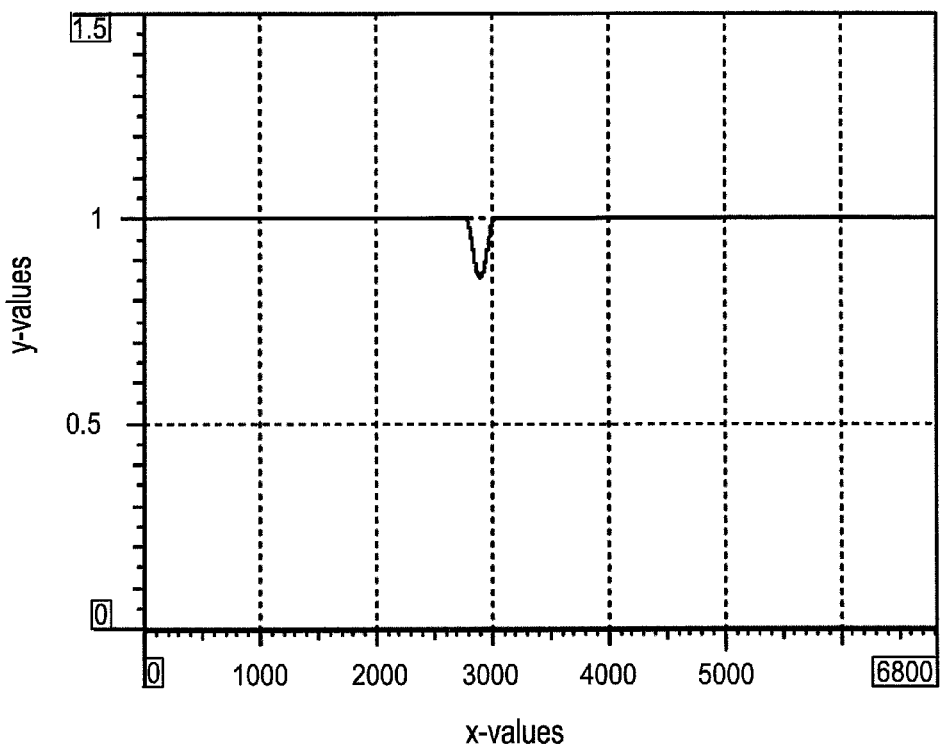
FIG. 5 shows the absolute squared value over a complete OFDM signal and the resulting ripple.

Equation (12) is a differential modulation, which changes the phases in equation (8) from summand to summand. Preferably, the phase rotation between two consecutive summands is limited, e.g. to π/4 in case of equation (12). However, other limitation values (angles) are also possible. FIG. 5 shows the reason for the cos-roll-off function. The overlapping parts of two cos-roll-off functions have to be added in the complex domain. In case of phase changes, the resulting absolute amplitude is less than 1. However, the ripples in this example are only 0.7 dB deep and will most probably not have any effect. Furthermore, the mean power of P(k) can be normalized to 1. It is a general problem that these ripples occur. They can only be avoided in case of cyclic delay diversity (see equation (5)) or if the broadening of the impulse response is infinite, which does not allow sampling the channel transfer function using the pilots. It shall be noted here that a selection of α=1 (see equation (7)) would lead to a broader signal drop in the signal shown in FIG. 5.

Next, an example shall be explained for a transmission system having two transmitters. For obtaining highest decorrelation, each transmitter is provided with a unique identification sequence c. As an example, the first transmitter (indicated by the index 1 in the following) gets the transmitter identification sequence $c_1$=(0, 0, 0, 0, 0, 0, 0, 0, 0, 0, 0, 0, 0, 0, 0) (i.e. 15 zeros). This actually means that the signal is not modified and the phase parameter applied by the first transmitter is $$\Psi_1=(0,0,0,0,0,0,0,0,0,0,0,0,0,0,0).$$

Figure 6:
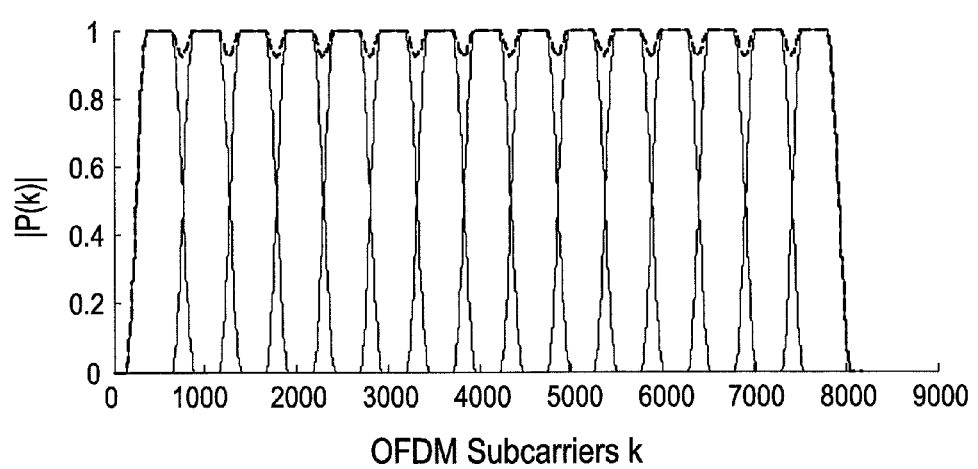
FIG. 6 shows an example of an absolute value of a distortion function for a transmitter identification function.

The second transmitter is provided with the transmitter identification sequence $c_2$=(1, 1, 1, 1, 1, 1, 1, 1, 1, 1, 1, 1, 1, 1, 1) (i.e. 15 ones). Hence, the phase changes from summand to summand and the phase parameter applied by the first transmitter is $$\Psi_2=(1/8,1/4,3/8,1/2,5/8,3/4,7/8,1,9/8,5/4,11/8,3/2,13/8,7/4,15/8),$$

i.e. the phase rotates by π/4 from summand to summand in equation (8). FIG. 6 shows the absolute value of the obtained distortion function P(k) for the second transmitter. Due to the effect already presented in FIG. 5, the transitions from the different cos-roll-off functions show slight ripples.

The received signals from both transmitters as (see equation (3)) can be written as $$R(k)=H_1(k)P_1(k)\cdot S_1(k)+H_2(k)P_2(k)\cdot S_2(k), \quad (13)$$

where $P_{tx}(k)$ is the linear pre-distortion, and $H_{tx}(k)$ is the channel transfer function from the different transmitters (indicated by index tx), and where any additive noise part is neglected for simplicity. As both transmitters transmit the same signal, i.e. $S_1(k)=S_2(k)=S(k)$, equation (13) can be simplified into $$R(k)=[H_1(k)P_1(k)+H_2(k)P_2(k)]\cdot S(k). \quad (14)$$

Figure 7:
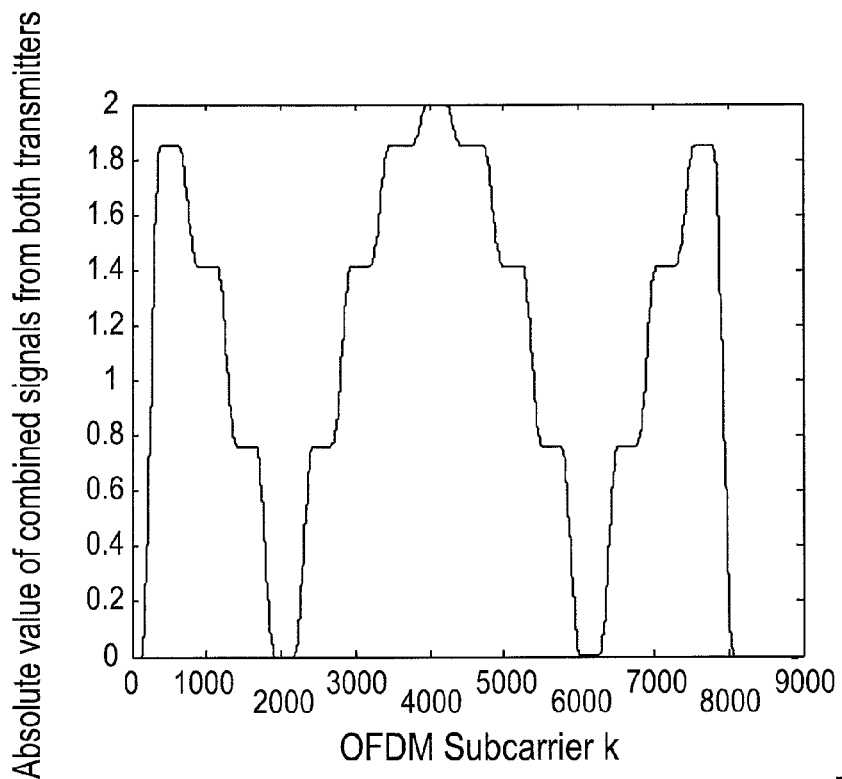
FIG. 7 shows combined signals of two transmitters.

The resulting signal for S(k)=1 and $H_1(k)=H_2(k)=1$ is shown in FIG. 7 showing combined signals of both transmitters, the signals fade on specific subcarriers (e.g. around 2000, 6000), but it is almost impossible that they fade on all subcarriers. The signals fade at specific OFDM subcarriers (or frequencies). However, due to linear pre-distortion it is extremely unlikely that both signals cancel each other completely, which would require that $H_1(k)P_1(k)+H_2(k)P_2(k)=0$ on all subcarriers k.

An important aspect of the transmitter identification sequence c is the possibility to identify a specific transmitter, e.g. within a single frequency network. A receiver can identify the differential phase changes between two different summands in equation (8). If the receiver has knowledge about the different identification sequences c in a network, the receiver can identify each transmitter by means of this sequence. This can, for instance, be used by the network operator to monitor the proper operation of each transmitter. Furthermore, it can also be used by a receiver to estimate its current position in the network.

Figure 8:
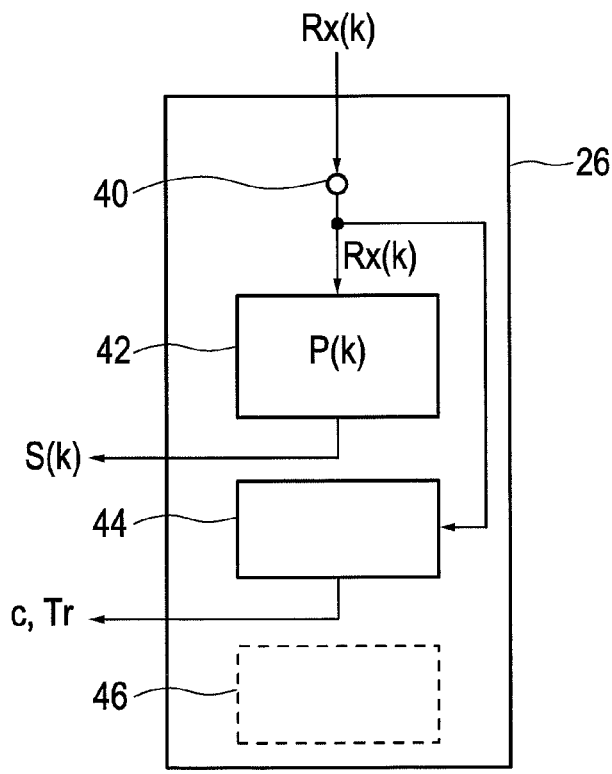
FIG. 8 shows a block diagram of a receiver apparatus according to the present invention.

A possible implementation of a receiver apparatus, as an example the receiver apparatus 26 shown in FIG. 1 for transmitter identification shall be explained below with reference to FIG. 8. The receiver apparatus 26 comprises a reception input 40 configured to receive a receive signal Rx(k). Said receive signal Rx(k) substantially corresponds to one or more transmission signals Tx(k) transmitted by transmission apparatuses (10, 14 within the reception area of the receiver apparatus 26. A transmission signal (Tx) corresponds, as explained above, to distorted multi-carrier signals, said multi-carrier signals S(k) being distorted by use of a distortion function P(k) including a phase parameter for differently modulating the phase of said multi-carrier signals S(k), wherein said distortion function P(k) used by a transmission apparatus is different from distortion functions used by other transmission apparatuses, whose coverage areas overlap with the coverage area of the present transmission apparatus, by using a phase parameter that is different from the phase parameter used by said other transmission apparatuses, wherein the phase parameter is determined by use of a phase function, which is identical for all transmission apparatuses within the reception area of the receiver apparatus, and a transmitter identification sequence, which is unique for each transmission apparatus within the reception area of the receiver apparatus 26.

The receiver apparatus 26 further comprises a signal evaluation unit 42 for evaluating said receive signal Rx(k) and retrieving the multi-carrier signals S(k). Further, the receiver apparatus 26 further comprises an identification unit 44 configured to identify one or more transmission apparatuses Tr, from which the one or more transmission signals included in said receive signal Rx(k) have been transmitted, by identification of said transmitter identification sequence c from said different phase distortions of the one or more transmission signals included in said receive signal Rx(k). This identification will be explained for an embodiment in more detail.

It shall be assumed that the receiver is able to completely decode the received signal. Hence, the receiver is able to locally reconstruct the transmitted signal S(k). Additionally, the used transmitter identification sequences c within the network are also known to the receiver. Consequently, the receiver is also able to locally reconstruct the distortion signals $P_x(k)$. However, the channel transfer functions $H_x(k)$ are unknown, because it is difficult for the receiver to separate the summed signal of the two transmitters.

A correlation process is used to identify the transmitters. Therefore, the time domain representation of the OFDM signals (i.e. the inverse Fourier transform), is needed, which are described by small letters. Thus, equation (14) can be reformulated as $$r(t)=[h_1(t)*p_1(t)+h_2(t)*p_2(t)]*s(t) \quad (15)$$

where the * denotes a convolution operation.

Furthermore, the receiver generates the following signal, $$e_x(t)=p_x(t)*s(t), \quad (16)$$

which is the time domain representation of the distortion function $P_x(k)$ convoluted with the transmitted signal $S(k)$.

Furthermore, it shall be assumed that the sequences c have been chosen such that the time domain representation of the transmitter sequence $p_x(t)$ are almost orthogonal, i.e., they possess vanishing cross-correlation functions. Then, equations (15) and (16) are combined using a correlation process:

$$\text{corr} = r(t) \otimes e_x(t) = r(-t) * e_x(t). \quad (17)$$

The symbol $\otimes$ denotes the correlation, which is equivalent to the convolution operation, if the time axis of the first term is mirrored. Further calculations of equation (17) lead to $$\begin{aligned}\text{corr} &= r(-t) * e_x(t) \\ &= (h_1(-t) * p_1(-t) + h_2(-t) * p_2(-t)) * s(-t) * p_x(t) * s(t) \\ &= \varphi_{ss}(t) * (h_1(-t) * p_1(-t) + h_2(-t) * p_2(-t)) * p_x(t),\end{aligned} \quad (18)$$

where $\phi_{ss}(t)$ denotes the auto-correlation of $s(t)$.

Now x=1 can be set in equation (18) in order to identify the first transmitter:

$$\begin{aligned}\text{corr} &= \varphi_{ss}(t)^*(h_1(-t) * p_1(-t) + h_2(-t) * p_2(-t)) * p_1(t) \\ &= \varphi_{ss}(t)^*(h_1(-t) * p_1(-t) * p_1(t) + h_2(-t) * p_2(-t) * p_1(t)).\end{aligned} \quad (19)$$

As it can be assumed that the $p_x(t)$ are orthogonal, equation (19) simplifees to $$\begin{aligned}\text{corr} &= \varphi_{ss}(t)^*(h_1(-t) * p_1(-t) * p_1(t) + h_2(-t) * p_2(-t) * p_1(t)) \\ &= \varphi_{ss}(t)^*(h_1(-t) * p_1(-t) * p_1(t)).\end{aligned} \quad (20)$$

Due to the orthogonality, the term of the second transmitter almost disappeared. Hence, the value of con only depends on the transmitter 1. If the absolute value of con is above a certain threshold, the transmitter has been detected in the network.

In an embodiment the receiver apparatus 26 further comprises an estimation unit 46 configured to estimate the current position of the receiver apparatus in the transmission system by use of the identified transmission apparatuses.

The present invention may also be used in other scenarios. For instance, in a scenario transmission devices are used, each having two or more transmission apparatuses (which can, for instance, be two or more transmission antennas) for transmitting data in different MIMO modes. Here, the term MIMO mode shall not be construed as being limited to selecting a MIMO (Multiple Input Multiple Output) antenna configuration, using at least two antennas for transmission in the transmitter and at least two antennas for reception in the receiver. In contrast, other modes and, thus, other antenna configurations shall also be available for selection, and the term MIMO mode selection shall thus be understood broadly in this broad sense. In particular, MIMO mode shall be understood as one of a SISO (Single Input Single Output) scheme, MISO (Multiple Input Single Output) scheme, SIMO (Single Input Multiple Output) scheme, or MIMO scheme, which represent the most common schemes, i.e. the MIMO mode available for selection can be MIMO, MISO or SISO scheme (often also called "mode" or "antenna configuration") in this embodiment.

Figure 9:
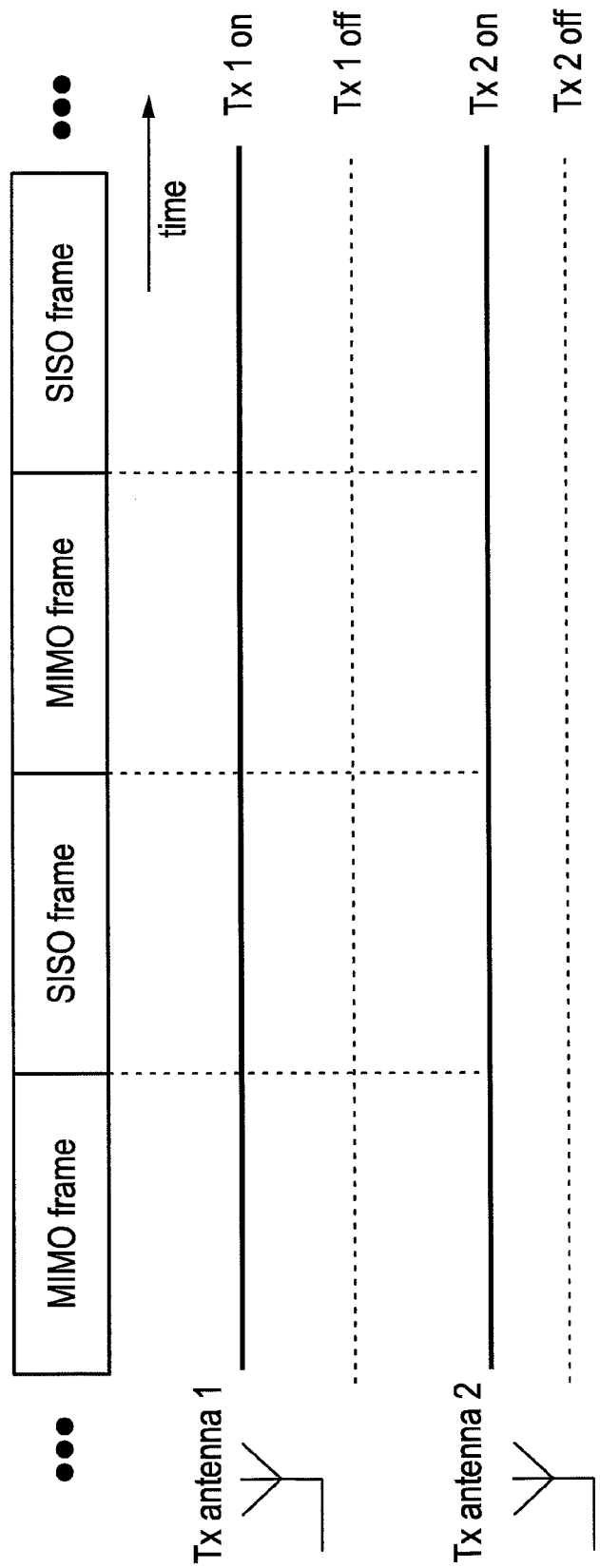
FIG. 9 shows a diagram illustrating an embodiment alternately using a MIMO scheme and a SISO scheme for transmitting data.

For instance, in an embodiment as shown in FIG. 9 a first transmission apparatus (antenna) is adapted for transmission of data blocks mapped onto data frames in any MIMO mode and wherein the further transmission apparatuses (antennas) are adapted for transmission of data blocks mapped onto data frames in the MISO scheme or MIMO scheme, wherein the one or more further apparatuses (antennas) are adapted for also transmitting data during times where the first transmission apparatus (antenna) is transmitting data blocks mapped onto data frames in the SISO scheme, and wherein said further transmission apparatuses (antennas) are preferably adapted for each substantially using the same transmission power as the first transmission apparatus (antenna). Generally, all transmission apparatuses (antennas) split up the total available transmission power.

This embodiment can generally be used in any kind of transmission system, including broadcast systems, using at least two transmission apparatuses (antennas) in which different MIMO modes are alternately used from time to time, i.e. where it is needed to quickly switch the one or more further transmission apparatuses (antennas) on and off. Such quick switching operations are thus avoided in such an embodiment of the present invention.

Preferably, said one or more further apparatuses (antennas) are adapted for transmitting, during times when the first transmission apparatuses (antennas) is transmitting data blocks mapped onto data frames in the SISO scheme, the same data as the first apparatus (antenna). This contributes to avoid undesired power variation among said one or more further apparatuses (antennas) and avoids the above described problems of destructive interferences leading to local signal drops or total signal losses.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A transmission apparatus for transmitting data within a multi-carrier transmission system including two or more transmission apparatuses that are configured to transmit same data, the same data being encoded and/or modulated a same way and being transmitted by using same transmission parameters, comprising:
   circuitry configured to
   receive multi-carrier signals carrying data to be transmitted;
   distort said multi-carrier signals by use of a distortion function including a phase parameter and a sum of two or more window functions for modulating phase of said multi-carrier signals, wherein said distortion function is different from distortion functions used by other transmission apparatuses whose coverage areas overlap with a coverage area of the transmission apparatus, by using the phase parameter that is different from phase parameters used by said other transmission apparatuses, and wherein said two or more window functions are configured to limit a length of an additional artificial impulse response caused by said distortion function and wherein each window function covers a set of a plurality of subcarriers in a frequency domain, sets of the plurality of subcarriers overlapping with or being adjacent to each other; and transmit said distorted multi-carrier signals as transmission signal.

2. The transmission apparatus as claimed in claim 1, wherein said circuitry is configured to use said distortion function comprising a sum of two or more identical window functions, wherein said sets of the plurality of subcarriers are overlapping with or adjacent to each other such that the sum of all window functions is substantially constant over a complete bandwidth covered by the plurality of subcarriers in the frequency domain.

3. The transmission apparatus as claimed in claim 1, wherein said circuitry is configured to use a sinc$^2$-function or a cos-roll-off function,
wherein the cos-roll-off function is of form $$W_{RC}(k) = \begin{cases} 1 & \text{if} & |k| \le \frac{1-\alpha}{2T} \\ \cos^2\left(\frac{\pi T}{2\alpha}\left(|k| - \frac{1-\alpha}{2T}\right)\right) & \text{if} & \frac{1-\alpha}{2T} < |k| \le \frac{1-\alpha}{2T} \\ 0 & \text{else} \end{cases}, \text{ and}$$

wherein k is a subcarrier index, T is a time constant, $\alpha$ is a cos-roll-off parameter having a value in a range from 0 to 1.

4. The transmission apparatus as claimed in claim 3, wherein said circuitry is configured to set parameter T to T=L/N, wherein L is a number of window functions.

5. The transmission apparatus as claimed in claim 1, wherein said circuitry is configured to multiply each window function of said sum of two or more window functions with a phase function including said phase parameter, wherein said phase parameter is constant within said phase function.

6. The transmission apparatus as claimed in claim 5, wherein said circuitry is configured to use different phase parameters within different phase functions.

7. The transmission apparatus as claimed in claim 1, wherein said circuitry is configured to use a phase function including the phase parameter, said phase function being identical for all transmission apparatuses whose coverage areas overlap with the coverage area of the transmission apparatus, and a transmitter identification sequence, which is unique for each of said transmission apparatuses.

8. The transmission apparatus as claimed in claim 7, wherein said circuitry is configured to use said phase parameter of form:

$$\Psi(0)=c(l)$$

$$\Psi(l)=\Psi(l-1)+c(l)/8 \text{ with } c \in \{-1,0,1\}$$

wherein c is the transmitter identification sequence and l is a window function index.

9. A transmission method for transmitting data within a multi-carrier transmission system including two or more transmission apparatuses that are configured to transmit same data, the same data being encoded and/or modulated in a same way and being transmitted by using same transmission parameters, comprising:

receiving multi-carrier signals carrying data to be transmitted;

distorting said multi-carrier signals by use of a distortion function including a phase parameter and a sum of two or more window functions for modulating phase of said multi-carrier signals, wherein said distortion function is different from distortion functions used by other transmission apparatuses whose coverage areas overlap with a coverage area of a transmission apparatus performing said transmission method, by using the phase parameter that is different from phase parameters used by said other transmission apparatuses, and wherein said two or more window functions are configured to limit a length of an additional artificial impulse response caused by said distortion function and wherein each window function covers a set of a plurality of subcarriers in a frequency domain, sets of the plurality of subcarriers overlapping with or being adjacent to each other; and transmitting said distorted multi-carrier signals as transmission signal.

10. A receiver apparatus for receiving data within a multi-carrier transmission system including two or more transmission apparatuses that are configured to transmit same data, the same data being encoded and/or modulated a same way and being transmitted by using same transmission parameters, comprising:

circuitry configured to receive a receive signal, said receive signal substantially corresponding to one or more transmission signals transmitted by the transmission apparatuses within a reception area of the receiver apparatus, wherein a transmission signal corresponds to distorted multi-carrier signals, said multi-carrier signals being distorted by use of a distortion function including a phase parameter and a sum of two or more window functions for modulating phase of said multi-carrier signals, wherein said distortion function used by a transmission apparatus is different from distortion functions used by other transmission apparatuses whose coverage areas overlap with a coverage area of the present transmission apparatus, by using the phase parameter that is different from phase parameters used by said other transmission apparatuses, wherein said two or more window functions are configured to limit a length of an additional artificial impulse response caused by said distortion function and wherein each window function covers a set of a plurality of subcarriers in a frequency domain, sets of the plurality of subcarriers overlapping with or being adjacent to each other, and wherein said distortion function uses a phase function including the phase parameter, the phase function being identical for all transmission apparatuses within the reception area of the receiver apparatus, and a transmitter identification sequence, which is unique for each transmission apparatus within the reception area of the receiver apparatus;

evaluate said receive signal and retrieve the multi-carrier signals; and identify one or more transmission apparatuses, from which the one or more transmission signals included in said receive signal have been transmitted, by identification of said transmitter identification sequence from different phase distortions of the one or more transmission signals included in said receive signal.

11. The receiver apparatus as claimed in claim 10,
wherein the circuitry is configured to estimate a current position of the receiver apparatus in the multi-carrier transmission system by use of the identified one or more transmission apparatuses.

12. A receiving method for receiving data within a multi-carrier transmission system including two or more transmission apparatuses that are configured to transmit same data, the same data being encoded and/or modulated a same way and being transmitted by using same transmission parameters, comprising:
 receiving a receive signal, said receive signal substantially corresponding to one or more transmission signals transmitted by the transmission apparatuses within a reception area of the receiver apparatus,
   wherein a transmission signal corresponds to distorted multi-carrier signals, said multi-carrier signals being distorted by use of a distortion function including a phase parameter and a sum of two or more window functions for modulating phase of said multi-carrier signals,
  wherein said distortion function used by a transmission apparatus is different from distortion functions used by other transmission apparatuses whose coverage areas overlap with a coverage area of the transmission apparatus, by using the phase parameter that is different from phase parameters used by said other transmission apparatuses,
  wherein said two or more window functions are configured to limit a length of an additional artificial impulse response caused by said distortion function and wherein each window function covers a set of a plurality of subcarriers in a frequency domain, sets of the plurality of subcarriers overlapping with or being adjacent to each other, and
  wherein said distortion function uses a phase function including the phase parameter, the phase function being identical for all transmission apparatuses within the reception area of the receiver apparatus performing said receiving method, and a transmitter identification sequence, which is unique for each transmission apparatus within the reception area of said receiver apparatus;
 evaluating said receive signal and retrieving the multi-carrier signals, and
 identifying one or more transmission apparatuses, from which the one or more transmission signals included in said receive signal have been transmitted, by identification of said transmitter identification sequence from different phase distortions of the one or more transmission signals included in said receive signal.

13. A multi-carrier transmission system comprising:
 at least two transmission apparatuses as claimed in claim 1 for transmitting the same data, and
 at least one receiving apparatus for receiving data.

14. A non-transitory computer readable medium comprising executable instructions for causing a computer to perform the method as claimed in claim 9 when executed on a computer.

15. A non-transitory computer readable medium comprising computer executable instructions stored thereon to perform the method as claimed in claim 12 when executed on a computer.

* * * * *